United States Patent
Tada et al.

(10) Patent No.: US 6,688,121 B2
(45) Date of Patent: Feb. 10, 2004

(54) CONTROLLED COMPRESSOR APPARATUS

(75) Inventors: Yoshiki Tada, Okazaki (JP); Shigeki Iwanami, Okazaki (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 10/230,254

(22) Filed: Aug. 29, 2002

(65) Prior Publication Data
US 2003/0041603 A1 Mar. 6, 2003

(30) Foreign Application Priority Data
Aug. 31, 2001 (JP) ....................... 2001-264204

(51) Int. Cl.[7] .............. B60H 1/32; F25B 27/00
(52) U.S. Cl. .......................... 62/134; 62/236
(58) Field of Search ................. 62/134, 236, 133, 62/230, 228.4

(56) References Cited

U.S. PATENT DOCUMENTS

| | | | |
|---|---|---|---|
| 5,265,435 A | * | 11/1993 | Richardson ................ 62/133 |
| 5,507,153 A | * | 4/1996 | Seto et al. ................ 62/133 |
| 6,230,507 B1 | * | 5/2001 | Ban et al. ................ 62/228.4 |
| 6,247,899 B1 | * | 6/2001 | Ban et al. ................ 417/16 |
| 6,287,081 B1 | * | 9/2001 | Tamegai et al. ............ 417/15 |
| 2002/0104321 A1 | * | 8/2002 | Odachi et al. ............. 62/133 |
| 2002/0124580 A1 | * | 9/2002 | Suitou et al. ............. 62/133 |
| 2002/0157414 A1 | * | 10/2002 | Iwanami et al. ............ 62/239 |

FOREIGN PATENT DOCUMENTS

JP    A-2000-229516    8/2000

* cited by examiner

*Primary Examiner*—Marc Norman
(74) *Attorney, Agent, or Firm*—Posz & Bethards, PLC

(57) ABSTRACT

A controlled compressor apparatus for idle-stopping vehicles that permits precise variable displacement control of a compressor and reduces power consumption when the compressor is motor-driven. The apparatus includes a battery-powered motor and a control unit for selecting the engine or the motor to drive the compressor and for controlling the displacement of the compressor. A current detector detects the magnitude of a current supplied to the motor. The control unit stores a relationship between the displacement and the current and controls the displacement based on the current detected by the current detector.

9 Claims, 6 Drawing Sheets

CONTROLLED COMPRESSOR APPARATUS

CROSS REFERENCE TO RELATED APPLICATION

This application relates to and incorporates by reference Japanese patent application 2001-264204, which was filed on Aug. 31, 2001.

BACKGROUND OF THE INVENTION

The invention relates to a controlled compressor apparatus, which is applicable to an air conditioning system of a so-called idle-stop vehicle, in which the engine is stopped when the vehicle stops.

A compressor control apparatus is shown in Japanese patent publication No. 2000-229516, in which a compressor unit is selectively actuated by an engine or a motor unit to operate a refrigeration apparatus. In this compressor control apparatus, the compressor unit is driven through an electromagnetic clutch when the engine is running. When the engine is stopped, the electromagnetic clutch is disengaged and the compressor unit is driven by the motor unit, which is powered with a battery.

Since a large amount of electric power is required to actuate the compressor unit, the motor unit is preferably confined to minimum necessary operation. The compressor unit is a variable displacement compressor of swash plate type. Before the engine is stopped, the displacement of the compressor unit is increased to lower the cooling temperature. The displacement is then reduced, and the compressor unit is driven by both the engine and the motor unit. Subsequently, the electromagnetic clutch is disengaged and the engine is stopped so that the compressor unit is actuated by the motor unit alone This achieves a reduction in power consumption by driving the compressor unit by the motor unit.

The control to adjust the displacement of the compressor unit, however, is exercised based on the tilt angle of the swash plate. Detecting the tilt angle complicates the internal structure of the compressor unit and increases costs.

Variable displacement control, not only on swash plate type compressor units but in general, is often performed based on the cooling temperature and the internal pressure of the refrigeration circuit. This temperature and pressure are associated with the displacement only indirectly, and unnecessary power consumption of the motor unit occurs due to response delays.

SUMMARY OF THE INVENTION

In view of the foregoing problem, it is an object of the present invention to provide a controlled compressor apparatus that allows easy, precise variable control of displacement and reduces unnecessary power consumption under motor-driven operation.

To achieve the foregoing object, the invention according to a first aspect is a controlled compressor apparatus for use in a vehicle having an engine to be stopped when the vehicle comes to a temporary halt while moving. The apparatus includes: a compressor unit of variable displacement type for compressing a refrigerant, the compressor unit being included in a refrigeration apparatus; a motor unit powered by a battery; a control unit for selecting the engine or the motor unit to drive the compressor unit and for controlling the displacement of the compressor unit; and current detector for detecting a current value supplied to the motor unit. The control unit stores a correlation characteristic between the displacement and the current value in advance, and controls the displacement based on the current value detected by the current detector.

The displacement of the compressor unit is adjusted to be proportional to the load torque of the compressor unit, i.e., the driving torque of the motor unit. Since the driving torque is proportional to the current value of the motor, the displacement is proportional to the current value. The displacement can thus be controlled easily and almost directly with high precision, in terms of the current value. This eliminates unnecessary power consumption in actuating the compressor unit by the motor unit.

According to another aspect of the invention, the control unit minimizes the displacement of the compressor unit before it starts the motor unit to drive the compressor unit.

Consequently, the motor unit can be started at a minimum torque, which avoids excessive starting currents and reduces the starting power consumption. Since the starting current is not excessive, the motor unit can be simplified and reduced in size.

According to another aspect of the invention, the control unit increases the current value of the motor unit to a target current value corresponding to a required displacement while successively decreasing a current increasing rate so that the current value reaches the target current value without exceeding the target current value.

Consequently, without overshooting the target current value, the current value reaches the target current value in a short time, and the starting power consumption is reduced.

According to another aspect of the invention, the control unit increases the current value of the motor unit to a target current value corresponding to a required displacement so that the current value reaches the target current value through proportional-plus-integral-plus-derivative control.

Consequently, without a large overshoot, the target current value is reached in a short time and the starting power consumption is reduced.

According to another of the invention, the current detector is arranged near the battery.

This allows the displacement to be controlled in terms of the current value and allows the battery capacity to be checked as well, which prevents over-draining of the battery.

According to another aspect the invention, the control unit reduces the displacement of the compressor unit when the current value detected by the current detector exceeds a predetermined value.

The motor unit can thus be prevented from exceeding its maximum possible output torque, which prevents lockup of the motor.

According to another aspect of the invention, the control unit has an engine start request function for requesting an engine control unit, which controls operation of the engine, to start the engine, and the control unit stops the motor unit and exercises the engine start request function to start the engine when an integrated current value of the motor unit actuating the compressor unit exceeds a predetermined integral.

This prevents over-draining the battery. When the engine is started, the battery is charged for the next actuation of the motor unit.

In another aspect of the invention, the displacement of the compressor unit may be controlled in terms of a voltage value instead of the current value. This variation achieves the same effects achieved by the first aspect of the invention.

In another aspect of the invention, the compressor unit is suitably integrated with the motor unit and used as a hybrid compressor to be selectively powered by the engine or the motor unit.

DETAILED DESCRIPTION OF THE PREFERRED EMBODIMENTS

First Embodiment

Figure 1:
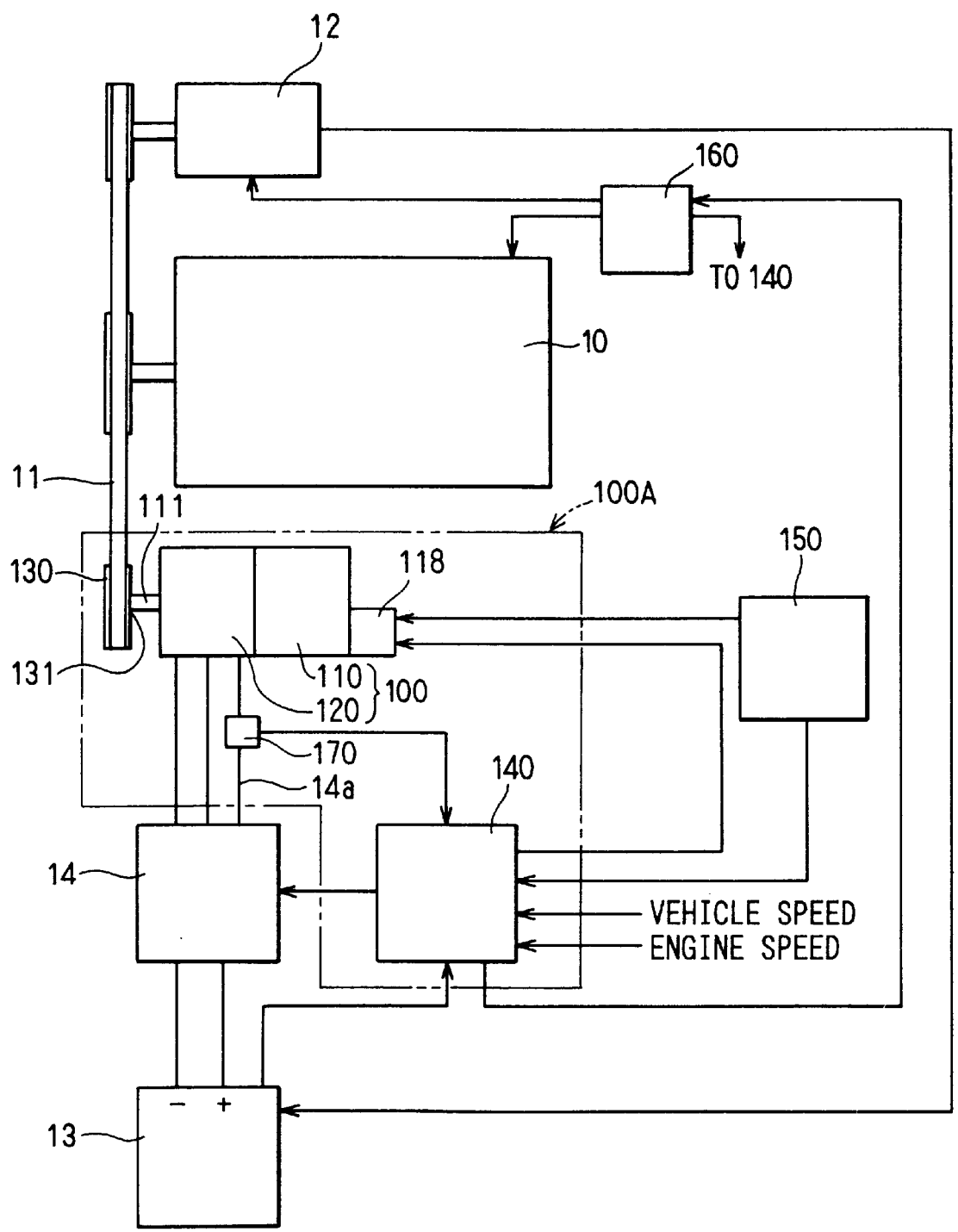
FIG. 1 is a block diagram showing the overall configuration of a vehicle engine and accessories to which a controlled compressor apparatus according to a first embodiment of the present invention is applied.

FIGS. 1 through 5B show a first embodiment of the present invention. The compressor in FIG. 1 is a hybrid compressor 100 in which a compressor unit 110 and a motor unit 120 are integrated. A controlled compressor apparatus 100A includes the hybrid compressor 100, a control unit 140, and a current detector 170. Of these, the compressor unit 110 is arranged in a refrigeration apparatus (not illustrated) of a vehicle air conditioning system.

The vehicle is a so-called idle-stop vehicle, in which the engine 10 is stopped when the vehicle comes to a temporary halt at stoplights and the like while moving. If the refrigeration apparatus is in operation, the compressor unit 110 is powered by the engine 10 through a belt 11 when the vehicle is moving. When the engine 10 is stopped at a halt, the compressor unit 110 is powered by the motor unit 120, which is powered by a battery 13.

Incidentally, the engine 10 is controlled by an engine control unit 160 for driving. This engine 10 is provided with an alternator 12, a well-known generator. This alternator 12 charges the battery 13 with power to be consumed in actuating the motor unit 120 while the engine 10 is stopped and power to be consumed in actuating various vehicle accessories. As with the engine 10, the alternator 12 is controlled by the engine control unit 160.

The refrigeration apparatus is well-known. The refrigeration apparatus includes of the compressor unit 110, a condenser, an expansion valve, and an evaporator, which are connected in series by refrigerant piping. The compressor unit 110 compresses refrigerant in the refrigeration apparatus to high temperature and high pressure. The condenser condenses and liquefies the compressed refrigerant. The expansion valve expands the liquefied refrigerant adiabatically. The evaporator evaporates the expanded refrigerant so that air passing through the evaporator is cooled by the latent heat of vaporization.

Next, the hybrid compressor 100 is described. The discharge rate, or per-rotation displacement of the compressor unit 110, is adjusted by the control unit 140. A well-known swash plate type variable displacement compressor is used. A control valve 118 is arranged on the right end of the compressor unit 110. The opening of the control valve 118 is adjusted so that the tilt angle of the swash plate varies, for displacement adjustment. Specifically, the tilt angle of the swash plate is reduced to shorten the piston stroke in the compression chamber, which reduces the displacement. On the other hand, the tilt angle of the swash plate is increased to extend the piston stroke in the compression chamber, which increases the displacement. The swash plate is pressed by a spring member toward the minimum tilt angle (near zero in terms of displacement) when the compressor unit 110 is not in operation.

The motor unit 120 is an AC three-phase motor, which runs on a power supply from an inverter 14 for converting the DC power from the battery 13 into AC power. One end of a shaft 111 is coupled to the compressor unit 110. A pulley 130 is arranged on the other end (external end) of the shaft 111 through a one-way clutch 131. The pulley 130 is coupled to the engine 10 with the belt 11.

While the engine 10 is rotating, the one-way clutch 131 establishes a connection between the pulley 130 and the shaft 111. The driving force of the engine 10 is transmitted to the shaft 111 to drive the compressor unit 110. When the engine 10 is stopped, the motor unit 120 rotates in the same direction as the engine 10 so that the clutch 131 is disengaged. The compressor unit 110 can thus be driven without interference by the pulley 130.

The current detector 170 for detecting the value of the current supplied to the motor unit 120 is arranged on a lead 14a, which connects the motor unit 120 and the inverter 14. The current detector 170 sends a current value signal to the control unit 140.

An air conditioning ECU 150 is intended to control the operations of various parts of the refrigeration apparatus. As for the controlled compressor apparatus 100A, the air conditioning ECU 150 controls the opening of the control valve 118 of the compressor unit 110 and sends signals to the control unit 140. The signals include a signal for indicating that the refrigeration apparatus is in operation (A/C request signal) and a discharge rate signal indicating the refrigerant required at that moment (more specifically, a required displacement signal indicating the required displacement of the compressor unit 110).

The control unit 140 is intended to control the operation of the hybrid compressor 100. A vehicle speed signal and an engine speed signal from the engine control unit 160, a battery capacity signal from the battery 13, the A/C request signal and the required displacement signal from the air conditioning ECU 150, and the current value signal from the current detector 170 are input to the control unit 140.

Figure 2B:
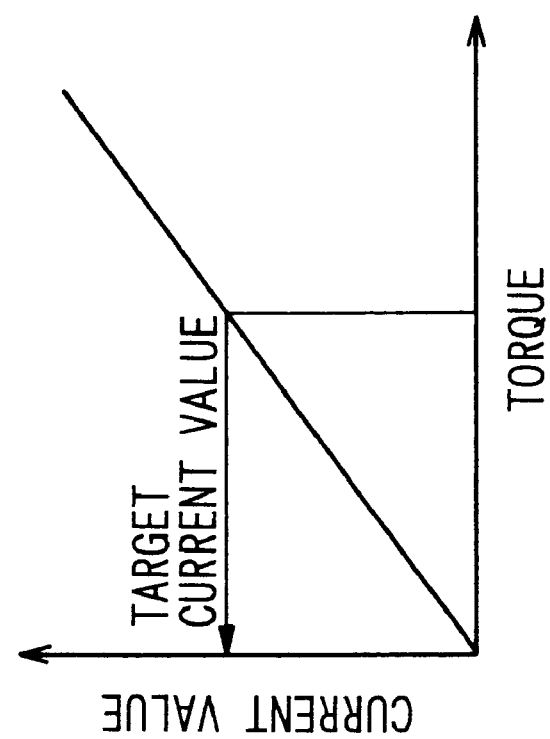
FIG. 2B is a graph showing the current value of a motor unit with respect to the load torque of the motor unit.
Figure 2A:
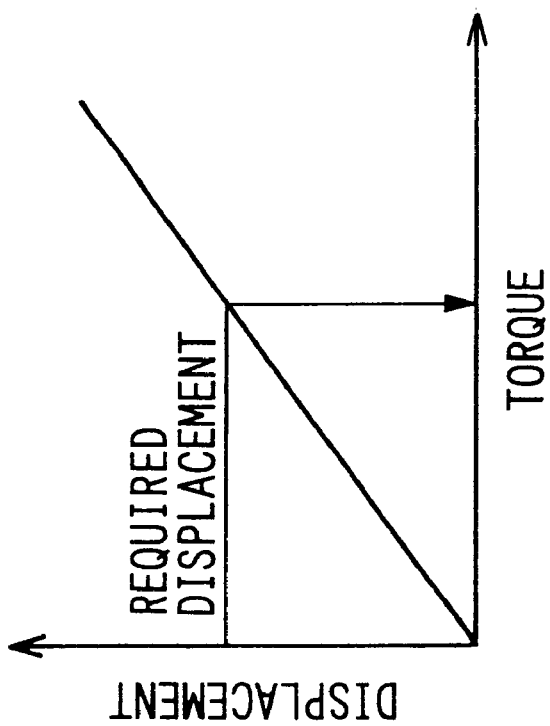
FIG. 2A is a graph showing the displacement of a compressor unit with respect to the load torque of the motor unit.

The control unit 140 stores in advance the correlation characteristic (proportional relationship) between the displacement and the driving torque of the motor unit 120 (i.e., the load torque of the compressor unit 110) and the correlation characteristic (proportional relationship) between the current value of the motor unit 120 and the driving torque as shown in FIGS. 2A and 2B, respectively. The control unit 140 calculates a target current value corresponding to the required displacement instructed from the air conditioning ECU 150. In this connection, FIG. 2A shows that the tilt angle of the internal swash plate is changed according to the load torque of the compressor unit 110, thus setting the displacement (the displacement and the tilt angle are proportional).

Then, the control unit 140 adjusts the opening of the control valve 118 of the compressor unit 110 and starts or stops the motor unit 120 according to the various signals mentioned above. In particular, when the motor unit 120 is started, the displacement is minimized in advance. Then, the motor unit 120 is activated with gradual decreases in current increasing rate (to be detailed later).

The control unit 140 also has the function of outputting a signal for requesting the engine control unit 160 to start the engine 10 according to the battery capacity signal.

Now, the operation of the hybrid compressor is described. In basic operation, or when the air conditioner is in operation while the vehicle is moving, the compressor unit 110 of the hybrid compressor 100 is driven directly by the engine 10. Here, the air conditioning ECU 150 controls the opening of the control valve 118 of the compressor unit 110 to a displacement necessary for cooling. When the cooling air temperature at the evaporator falls to or below a predetermined temperature and the air conditioner is not in operation while the vehicle is moving, the displacement of the compressor unit 110 is minimized (nearly zero in displacement). This establishes a low-load condition (almost idle state), reducing the load on the engine 10.

The present embodiment is characterized by the control during vehicle stoppage. A detailed description of the control procedure is given below with reference to the control flowchart shown in FIGS. 3 and 4 and the time charts shown in FIGS. 5A and 5B.

Figure 3:
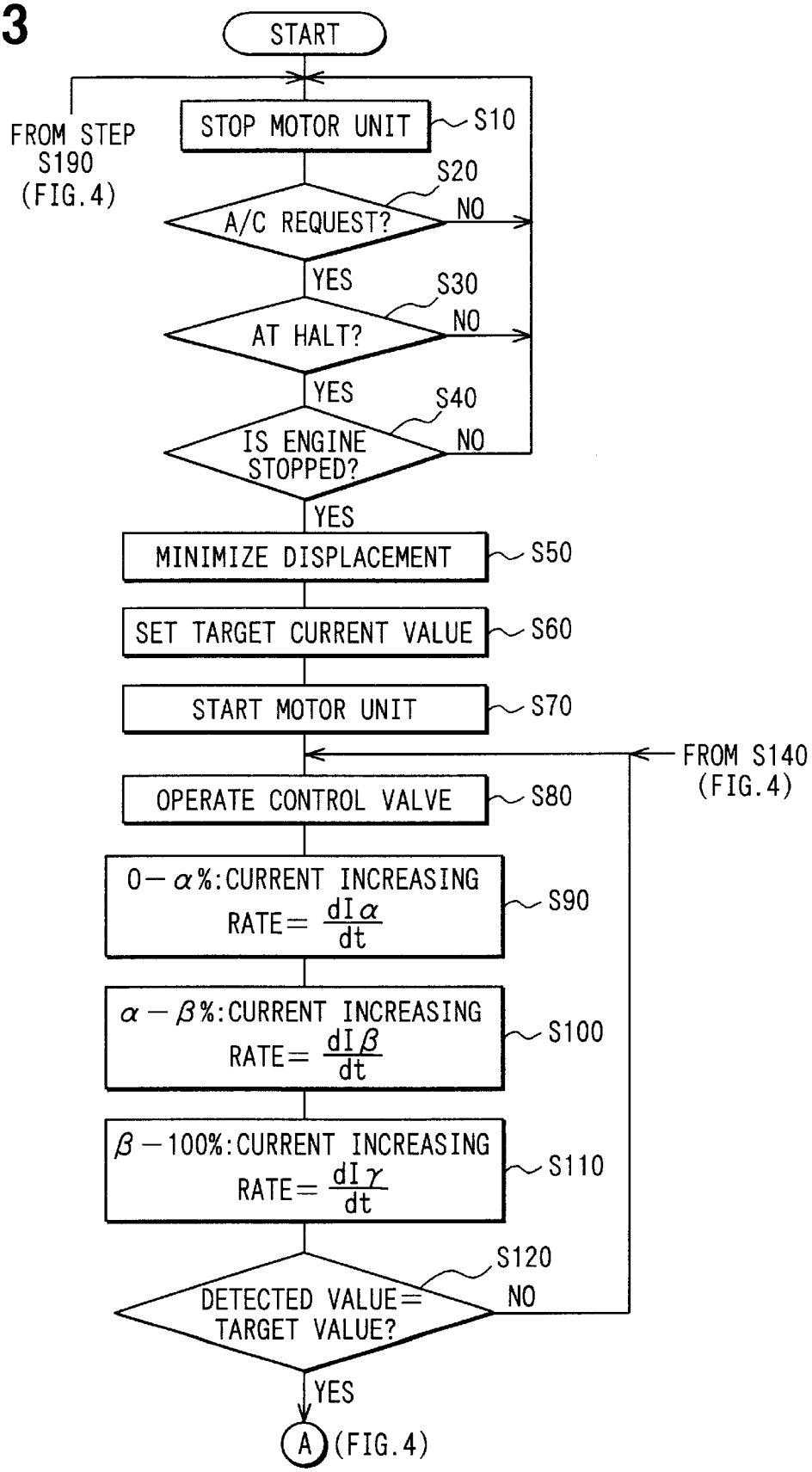
FIG. 3 is a flowchart showing the first part of control procedure of a hybrid compressor.
Figure 4:
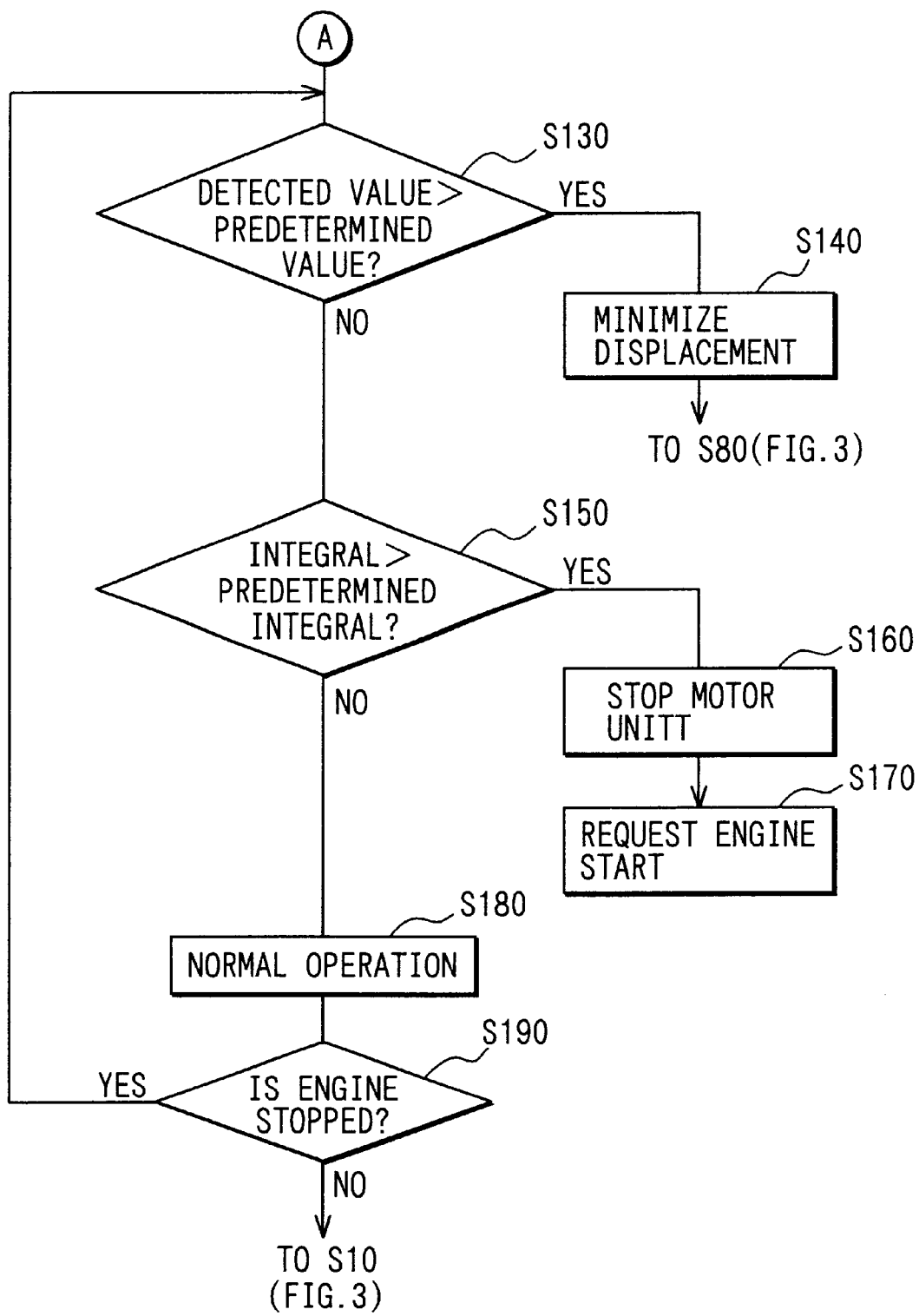
FIG. 4 is a flowchart showing the second part of the control procedure of the hybrid compressor.

Initially, at step S10 of the flowchart of FIGS. 3 and 4, the motor unit 120 is stopped. At step S20, whether an A/C request is issued or not is determined from the A/C request signal. At step S30, whether the vehicle is stopped or not is determined from the vehicle speed signal. At step S40, whether the engine 10 is stopped or not is determined from the engine speed signal. If all of steps S20 through S40 have a positive outcome, step S50 is performed. If the outcome is negative in any of steps S20 through S40, the process returns to step S10 as shown.

At and after step S50, the compressor unit 110 is powered by the motor unit 120 when the A/C request is issued, the engine 10 is stopped, and the vehicle is halted. Before the motor unit 120 is started, the displacement of the compressor unit 110 is minimized (near zero in displacement) at step S50. This minimization is achieved by the spring member mentioned above.

Next, at step S60, a target current value is set. The target current value is obtained by converting the required displacement, which is called for by the air conditioning ECU 150, into a corresponding current value based on the predetermined relationships represented by FIGS. 2A and 2B.

At step S70, the motor unit 120 is started. At step S80, the opening of the control valve 118 is adjusted for the required displacement. That is, the current supplied to the motor unit 120 and the opening of the control valve 118 are adjusted so that the current value obtained at the current detector 170 coincides with the target current value.

The present embodiment is also characterized by the manner in which the starting current value increases. As will be described in the following steps S90 to S110, the motor unit 120 is supplied with a current that is directed to the target current value, and the rate of increase of the supply current while approaching the target value successively decreases.

Figure 5B:
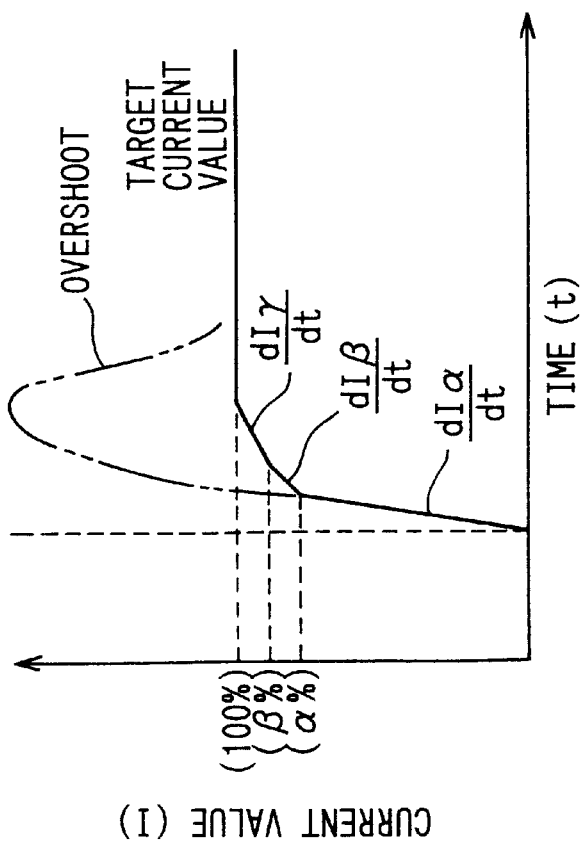
FIG. 5B is a graph showing the displacement of the compressor unit with respect to time.
Figure 5A:
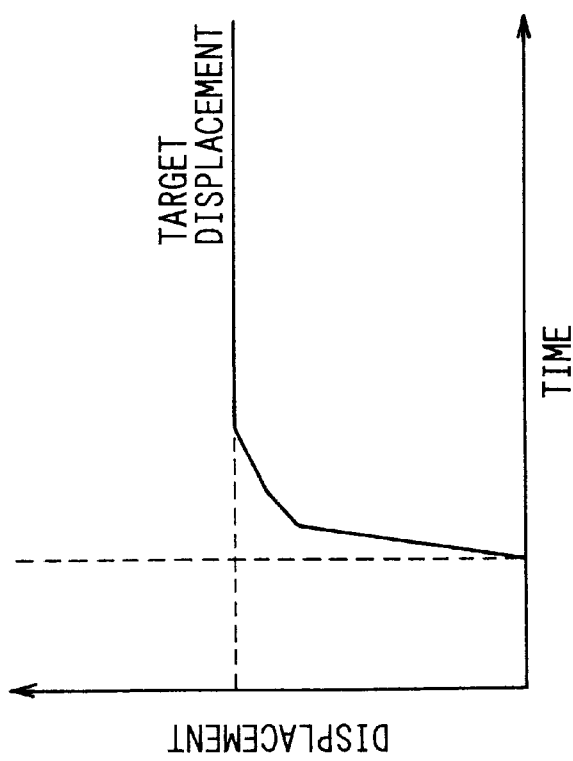
FIG. 5A is a graph showing the current value of the motor unit with respect to time.

Suppose, as shown in FIG. 5A, that the target current value is 100%, and the target current value is divided into a plurality of segments. The current increasing rate $dI\beta/dt$ is successively decreased, segment by segment as illustrated in FIG. 5A. Specifically, if the number of segments is three, then the current increasing rate $dI\alpha/dt$, by which the supply current varies from zero to $\alpha\%$, the current increasing rate $dI\beta/dt$, by which the supply current varies from $\alpha\%$ to $\beta\%$, and the current increasing rate $dI\gamma/dt$, by which the supply current varies from $\beta\%$ to $100\%$, decrease in succession, as expressed by the following:

$$dI\alpha/dt > dI\beta/dt > dI\gamma/dt$$

At step S120, whether the current value detected by the current detector 170 has reached the target current value is determined. If the target current value has been reached, this state is maintained. That is, the required displacement is maintained, and the compressor unit 110 continues operating at this displacement. More specifically, a determination is made as to whether the current value falls within a range that is set by predetermined margins about the target current value. If the outcome of step S120 is negative, the process returns to step S80 as shown.

Next, at steps S130 and S140, action is taken if an abnormal current value is detected while the motor unit 120 is in operation. More specifically, at step S130, whether the current value detected is higher than a predetermined value is determined. If the current value is higher, the displacement of the compressor unit 110 is reduced (in this embodiment, the displacement is minimized) at step S140 before the process returns to step S80. The predetermined value is a current value that corresponds to a torque near the maximum possible torque (lower than the maximum torque value) for the motor unit 120 to output. Exceeding this predetermined value indicates a lock-up of the motor, which is prevented by this procedure.

Next, at step S150, whether the integral of the current during the operation of the motor unit 120 is greater than a predetermined integral is determined. If the integral is greater, the motor unit 120 is stopped at step S160. Then, at step S170, a request to start the engine 10 is issued to the engine control unit 160. This predetermined integral is a criterion intended to prevent a dead battery. This prevents over-draining of the battery 13. Consequently, the engine 10 is started and the compressor unit 110 is driven by the engine 10 to continue operating the refrigeration apparatus. In addition, the alternator 12 generates electricity to charge the battery 13.

If the outcomes of both the foregoing steps S130 and S150 are negative, indicating the absence of a problem, normal operation is continued at step S180. At step S190, whether the engine 10 is stopped is determined. If the engine is stopped, steps S130 to S180 are repeated. If the engine 10 is not stopped, i.e., if is determined that the engine has started, the process returns to step S10 to stop the motor unit 120.

Initially, as seen in FIGS. 2A and 2B, the displacement of the compressor unit 110 is proportional to the load torque of the compressor unit 110, i.e., the driving torque of the motor unit 120 (the displacement is also proportional to the tilt angle of the swash plate in this embodiment). Since the driving torque of the motor is proportional to the current value of the motor unit 120, the displacement is proportional to the current value. The displacement can thus be controlled easily and almost directly with high precision, in terms of the current value. This eliminates unnecessary power consumption in actuating the compressor unit 110 by the motor unit 120.

The motor unit 120 is started after the displacement of the compressor unit 110 is minimized. It follows that the motor unit 120 starts up under minimum torque, which avoids excessive starting currents and reduces the starting power consumption. Since the starting current is not excessive, the motor unit 120 can be simplified, which allows miniaturization.

In the process of increasing the supply current to the target current value, the rate of increase of the supply current is adjusted to decrease successively so that the target current value is not exceeded. As a result, the current value is prevented from overshooting the target current value as shown by the double-dashed line in FIG. 5A. The target current value can be reached in a short time with a reduction in the starting power consumption.

If the current value detected by the current detector 170 exceeds a predetermined value, the compressor unit 110 is adjusted to smaller displacements (here, the minimum). The motor unit 120 can thus be prevented from exceeding its maximum possible output torque, which may cause a motor lock-up.

If the integral of the current of the motor unit 120 exceeds a predetermined integral, the motor unit 120 is stopped and the engine 10 is started. This prevents a dead battery. When the engine 10 is started, the battery 13 is charged for the next actuation of the motor unit 120.

Other Embodiments

In the first embodiment, the motor unit 120 is started while the current supply is adjusted so that the current increasing rate decreases successively. Alternatively, proportional-plus-integral-plus-derivative control may be used. In this case, the target current value can be reached in a short time with a reduction in the starting power consumption without overshooting the target current value.

The current detector 170 may be arranged near the battery 13, or between the battery 13 and the inverter 14. This allows displacement control based on the current value and allows checking of the battery capacity as well, making it possible to prevent over-draining the battery 13 (prevent a dead battery).

Instead of the current value, a voltage value may be used as the representative value for controlling the displacement of the compressor unit 110. The voltage value is available for the displacement control since it is also proportional to the current value. That is, the box designated by reference numeral 170 may also represent a voltage detector.

The compressor unit 110 has been described as a swash plate type variable displacement compressor. However, other variable displacement compressors, such as a through vane type, electric type, or the like may be used instead.

The motor unit 120 is not limited to an AC motor but may be a DC motor. In this case, the inverter 14 is unnecessary.

The clutch to connect and disconnect the pulley 130 and the shaft 111 is not limited to the one-way clutch 131 but may be an ordinary electromagnetic clutch.

Figure 6:
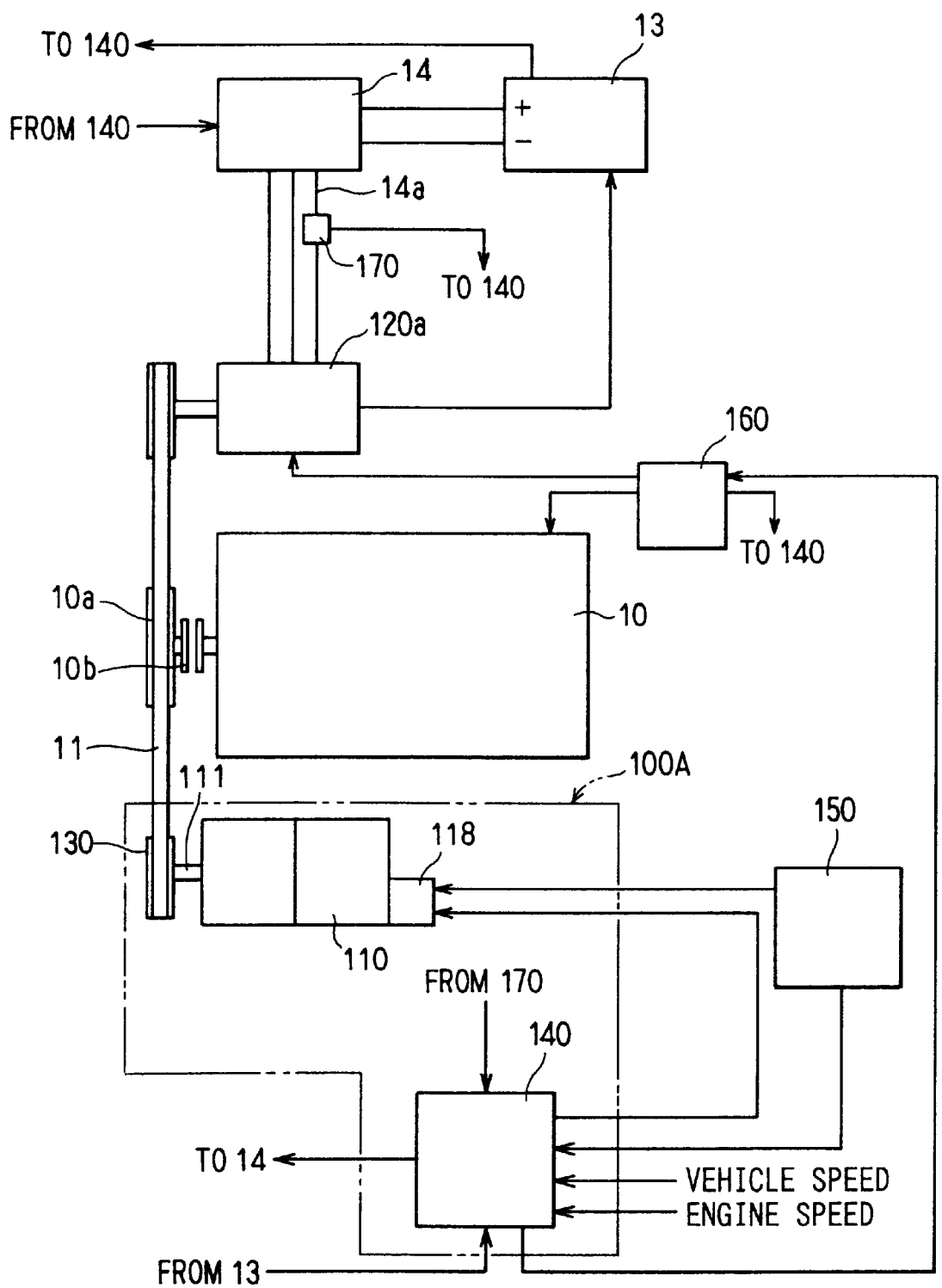
FIG. 6 is a block diagram showing the overall configuration of a vehicle engine and accessories, to which a controlled compressor apparatus according to another embodiment of the present invention is applied.

The first embodiment illustrates a case where the compressor is a hybrid compressor in which the compressor unit 110 and the motor unit 120 are integrated. As shown in FIG. 6, however, the hybrid compressor 100 may be replaced with an ordinary compressor unit 110 alone. In this case, the alternator 12 is replaced with a motor generator 120a, which has the functions of a motor and a generator. The power from the battery 13 is supplied to this motor generator 120a through the inverter 14. In addition, a crank shaft clutch 10b is arranged on the pulley 10a of the engine 10. The compressor unit 110 uses a swash plate type variable displacement compressor, as in the first embodiment. The connection between the pulley 130 and the shaft 111 is established without a clutch. Consequently, the compressor unit 110 is selectively actuated by the engine 10 or the motor generator 120 to provide the same effects that are provided by the first embodiment.

What is claimed is:

1. A controlled compressor apparatus for use in an engine-powered vehicle, in which the engine is stopped when the vehicle comes to a temporary halt, the apparatus comprising:
   a variable displacement compressor for compressing refrigerant, wherein the compressor is part of a refrigeration apparatus, and wherein the compressor can be driven by engine torque;
   a battery-powered motor, wherein the motor can drive the compressor;
   a current detector for detecting the level of an electric current supplied to the motor;
   a control unit for selecting the engine or the motor to drive the compressor and for controlling the displacement of the compressor, wherein a predetermined relationship between the displacement of the compressor and the current supplied to the motor is stored in the control unit, and the control unit controls the displacement of the compressor according to the predetermined relationship based on the current detected by the current detector, wherein the control unit minimizes the displacement of the compressor before the motor drives the compressor.

2. The controlled compressor apparatus according to claim 1, wherein the control unit increases the level of the current supplied to the motor to a target current value, which corresponds to a target displacement, while successively decreasing the rate of increase of the current, so that the supplied current reaches the target current value without exceeding the target current value.

3. The controlled compressor apparatus according to claim 1, wherein the control unit increases the level of the current supplied to the motor to a target current value, which corresponds to a target displacement, so that the supplied current reaches the target current value through proportional-plus-integral-plus-derivative control.

4. The controlled compressor apparatus according to claim 1, wherein the current detector is located near the battery that powers the motor.

5. The controlled compressor apparatus according to claim 1, wherein the control unit reduces the displacement of the compressor when the current detected by the current detector exceeds a predetermined value.

6. The controlled compressor apparatus according to claim 1, wherein the compressor is integrated with the motor in a hybrid compressor unit, which is selectively powered by the engine or the motor.

7. The controlled compressor apparatus according to claim 6, wherein the compressor is integrated with the motor in a hybrid compressor unit, which is selectively powered by the engine or the motor.

8. A controlled compressor apparatus for use in an engine-powered vehicle, in which the engine is stopped when the vehicle comes to a temporary halt, the apparatus comprising:
   a variable displacement compressor for compressing refrigerant, wherein the compressor is part of a refrigeration apparatus, and wherein the compressor can be driven by engine torque;
   a battery-powered motor, wherein the motor can drive the compressor;
   a current detector for detecting the level of an electric current supplied to the motor;

a control unit for selecting the engine or the motor to drive the compressor and for controlling the displacement of the compressor, wherein a predetermined relationship between the displacement of the compressor and the current supplied to the motor is stored in the control unit, and the control unit controls the displacement of the compressor according to the predetermined relationship based on the current detected by the current detector, wherein the control unit has an engine start request function for requesting an engine controller, which controls operation of the engine, to start the engine, and the control unit stops the motor and requests starting of the engine when an integral of the current supplied to the motor exceeds a predetermined integral value.

9. A controlled compressor apparatus for use in an engine-powered vehicle, in which the engine is stopped when the vehicle comes to a temporary halt, the apparatus comprising:

a variable displacement compressor for compressing refrigerant, wherein the compressor is part of a refrigeration apparatus, and wherein the compressor can be driven by engine torque;

a battery-powered motor, wherein the motor can drive the compressor;

a voltage detector for detecting the level of a voltage applied to the motor a control unit for selecting the engine or the motor to drive the compressor and for controlling the displacement of the compressor, wherein a predetermined relationship between the displacement of the compressor and the voltage applied to the motor is stored in the control unit, and the control unit controls the displacement of the compressor according to the predetermined relationship based on the voltage detected by the voltage detector.

* * * * *